United States Patent
Brian et al.

(10) Patent No.: US 8,769,426 B2
(45) Date of Patent: Jul. 1, 2014

(54) USER INTERFACE FOR MONITORING RESOURCE CONSUMPTION

(75) Inventors: Joseph Mark Brian, Louisville, KY (US); David C. Bingham, Louisville, KY (US); Rich Merwarth, Louisville, KY (US)

(73) Assignee: General Electric Company, Schenectady, NY (US)

( * ) Notice: Subject to any disclaimer, the term of this patent is extended or adjusted under 35 U.S.C. 154(b) by 317 days.

(21) Appl. No.: 13/237,264

(22) Filed: Sep. 20, 2011

(65) Prior Publication Data

US 2013/0073997 A1 Mar. 21, 2013

(51) Int. Cl.
*G06F 3/048* (2013.01)
*G06F 3/00* (2006.01)
*G06F 3/0481* (2013.01)
*G06F 3/0484* (2013.01)

(52) U.S. Cl.
CPC ............ *G06F 3/0481* (2013.01); *G06F 3/0484* (2013.01); *G06F 3/048* (2013.01); *G06F 3/04817* (2013.01)
USPC .......................... 715/772; 715/762; 715/776

(58) Field of Classification Search
CPC . G06F 3/0481; G06F 3/0484; G06F 19/3406; G06F 3/048; G06F 3/04817
USPC .......................................... 715/772, 762, 776
See application file for complete search history.

(56) References Cited

U.S. PATENT DOCUMENTS

| | | | | |
|---|---|---|---|---|
| 6,865,450 | B2 * | 3/2005 | Masticola et al. | 700/291 |
| 6,870,463 | B2 * | 3/2005 | Dresti et al. | 340/10.4 |
| 7,801,647 | B2 * | 9/2010 | Fickey et al. | 700/291 |
| 8,131,403 | B2 * | 3/2012 | Forbes et al. | 700/295 |
| 8,280,657 | B2 * | 10/2012 | Van Gorp et al. | 702/61 |
| 8,498,749 | B2 * | 7/2013 | Imes et al. | 700/276 |
| 8,532,273 | B2 * | 9/2013 | Park et al. | 379/106.01 |
| 8,538,595 | B2 * | 9/2013 | Lyren et al. | 700/292 |
| 8,542,685 | B2 * | 9/2013 | Forbes et al. | 370/392 |
| 8,600,564 | B2 * | 12/2013 | Imes et al. | 700/278 |
| 2004/0225625 | A1 * | 11/2004 | Van Gorp et al. | 705/412 |
| 2010/0250440 | A1 * | 9/2010 | Wang et al. | 705/63 |
| 2013/0073997 | A1 * | 3/2013 | Brian et al. | 715/772 |
| 2013/0167035 | A1 * | 6/2013 | Imes et al. | 715/736 |
| 2013/0318444 | A1 * | 11/2013 | Imes et al. | 715/733 |
| 2013/0325190 | A1 * | 12/2013 | Imes et al. | 700/276 |

* cited by examiner

*Primary Examiner* — David Phantana Angkool
(74) *Attorney, Agent, or Firm* — Global Patent Operation; Douglas D. Zhang

(57) ABSTRACT

A resource consumption user interface is disclosed comprising one or more user input features for selecting a start time and an end time for monitoring at least one resource consumption task from a plurality of resource consumption tasks that contribute to a total resource consumption in a given environment, wherein the plurality of resource consumption tasks are associated with one or more appliances that operate in the given environment. The resource consumption user interface also comprises one or more user output features for presenting information about the selected resource consumption task, beginning at the selected start time, and updating the presented information until the selected end time is reached.

20 Claims, 4 Drawing Sheets

USER INTERFACE FOR MONITORING RESOURCE CONSUMPTION

CROSS-REFERENCE TO RELATED APPLICATION

The present application is related to the U.S. patent application Ser. No. 13/237,239, entitled "User Interface for Determining Resource Consumption," filed concurrently herewith, the disclosure of which is incorporated herein by reference in its entirety.

BACKGROUND OF THE INVENTION

The subject matter disclosed herein relates to resource consumption, and more particularly to a resource consumption user interface.

Resource consumption, for example, energy consumption, particularly in a home environment, is receiving increased consideration in view of the ever-growing realization that energy resources are not limitless. Cost, pollution, and potential for climate change are also very strong reasons for evaluating energy consumption.

Energy consumption attributable to a home is typically monitored via one or more energy meters installed at the home. Such an energy meter measures the overall amount of a particular form of energy that is supplied to the home.

For example, an electric meter installed on the electric input line to a given home keeps track of the number of kilowatt-hours (kWh) that are supplied to, and thus consumed by, the given home. Unfortunately, there is no way for the occupant/owner of the home to determine how much of that energy consumption is attributed to specific loads over a given time period.

BRIEF DESCRIPTION OF THE INVENTION

As described herein, the exemplary embodiments of the present invention overcome one or more disadvantages known in the art.

One aspect of the present invention relates to a resource consumption user interface comprising one or more user input features for selecting a start time and an end time for monitoring at least one resource consumption task from a plurality of resource consumption tasks that contribute to a total resource consumption in a given environment, wherein the plurality of resource consumption tasks are associated with one or more appliances that operate in the given environment. The resource consumption user interface also comprises one or more user output features for presenting information about the selected resource consumption task, beginning at the selected start time, and updating the presented information until the selected end time is reached.

Another aspect of the invention relates to a resource consumption system comprising a user interface which comprises: (i) one or more user input features for selecting a start time and an end time for monitoring at least one resource consumption task from a plurality of resource consumption tasks that contribute to a total resource consumption in a given environment, wherein the plurality of resource consumption tasks are associated with one or more appliances that operate in the given environment; and (ii) one or more user output features for presenting information about the selected resource consumption task, beginning at the selected start time, and updating the presented information until the selected end time is reached. The resource consumption system also comprises a controller coupled to the user interface and configured to: (i) receive one or more selections from the one or more user input features; and (ii) in response thereto, provide the information to the one or more user output features for presentation.

In one or more embodiments, the resource may comprise an energy resource such as electricity or natural gas. However, in one or more alternative embodiments, the resource may comprise water.

Advantageously, illustrative principles of the present invention provide for an occupant/owner of the home to determine how much of their total resource consumption is attributed to one or more specific sources of resource consumption in the home over a given time period. Given a realization of this specific information, an occupant/owner can adjust his/her resource usage patterns in order to reduce resource consumption.

These and other aspects and advantages of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. Moreover, the drawings are not necessarily drawn to scale and, unless otherwise indicated, they are merely intended to conceptually illustrate the structures and procedures described herein.

DETAILED DESCRIPTION OF THE EXEMPLARY EMBODIMENTS OF THE INVENTION

Figure 1:
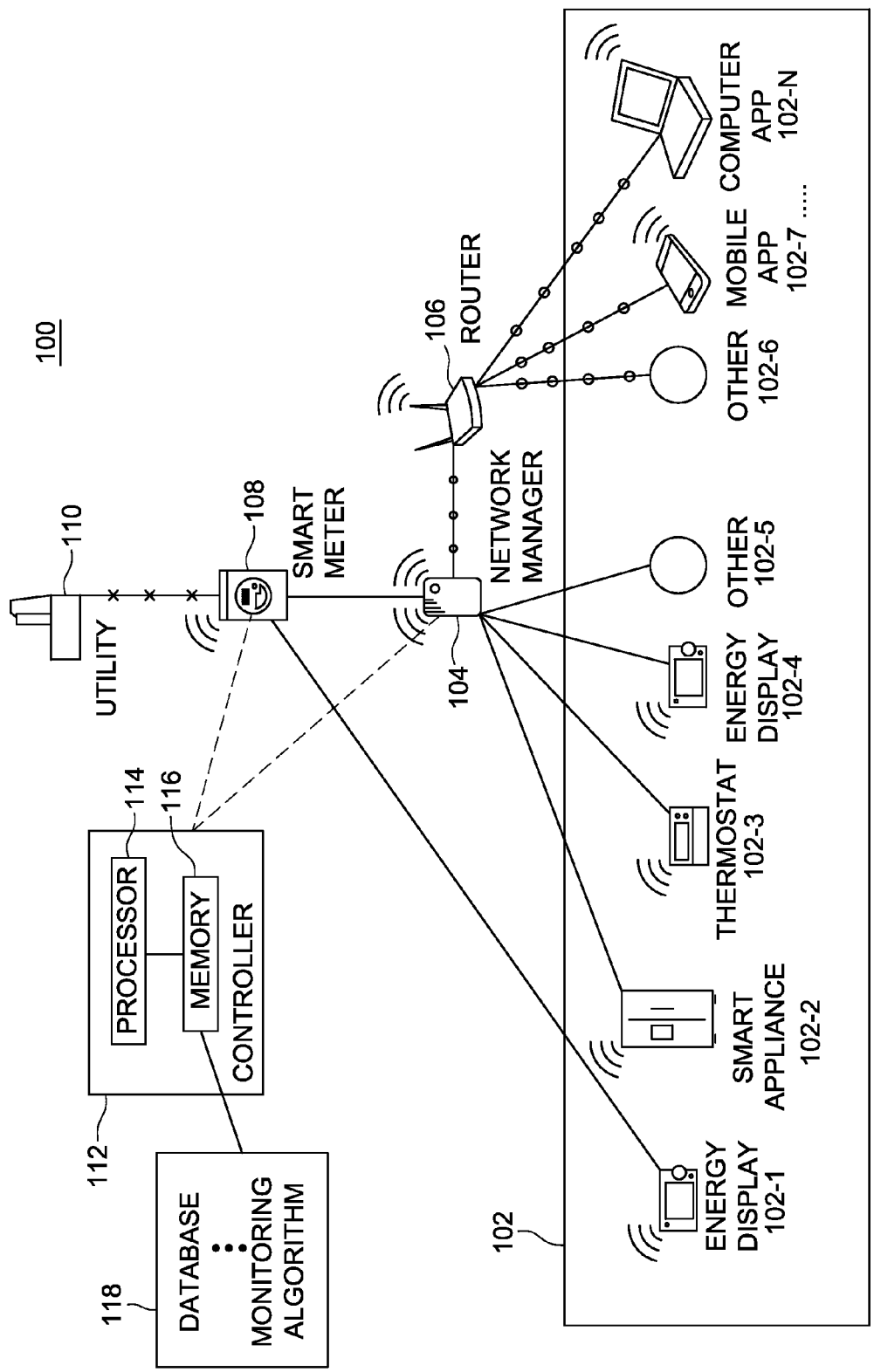
FIG. 1 is a diagram of a home energy system, in accordance with an embodiment of the invention.

One or more of the embodiments of the invention will be described below in the context of energy consumption (as an example of resource consumption) in association with appliances in a home or household environment. However, it is to be understood that principles of the invention are not intended to be limited to use in home or household environments or with any particular appliances. Rather, principles of the invention may be applied to and deployed in any other suitable environment in which it would be desirable to improve the monitoring of energy (resource) consumption.

As illustratively used herein, the term "appliance" is intended to refer to a device or equipment designed to perform one or more specific functions. This may include, but is not limited to, equipment for consumer use, e.g., a refrigerator, a cooking range, a laundry washer, a laundry dryer, a dishwasher, a microwave oven, water heaters, etc. This may include, but is not limited to, any equipment that is useable in household or commercial environments.

As used herein in illustrative embodiments, appliances include, but are not limited to, equipment that runs on electricity as an energy source. That is, other sources of energy other than electric may be monitored in accordance with an energy consumption user interface formed in accordance with illustrative principles of the invention. For example, one or more embodiments of the invention can be applied to monitor natural gas consumption. More generally, embodiments of the invention can be applied to resource consumption and not just energy consumption. For example, water consumption can be monitored using one or more embodiments of the invention. That is, for alternate resource consumption embodiments, the system would just be monitoring and reporting different units instead of kWh, for instance, gallons in the case of water or cubic feet in the case of natural gas. However, for clarity and consistency of explanation, the illustrative embodiments of the invention are described below in the context of energy consumption in the form of electricity in kWh.

As illustratively used herein, the phrase "user interface" is intended to refer to an area where interaction between a human and a machine occurs including but not limited to a user viewing or listening to some form of information presented by the machine and/or the user inputting one or more selections or commands to the machine. In at least some of the appliance embodiments described herein, the machine is the appliance and the human is the user or consumer, and interaction between the user and the appliance is via a user interface.

Illustrative principles of the invention provide apparatus, systems and methods that allow a homeowner to examine cumulative energy consumption and cost information on a minute-by-minute (or other time interval) basis relative to a user-initiated start time. To do so, the homeowner activates the energy consumption monitor provided through a user interface and an algorithm tracks accrued energy consumption and cost until the monitor is stopped. This energy consumption user interface and algorithm find particular use in analyzing task-based energy consumption and cost.

By way of example only, in a home environment, the homeowner can determine how much energy is used to dry a load of laundry in a laundry dryer in the home. A cost can also therefore be determined and presented to the homeowner.

By way of further example, assume a homeowner has contractors doing work at his/her house, and those contractors are using power equipment. In accordance with an energy consumption user interface and monitoring algorithm according to an illustrative embodiment of the invention, the homeowner can track in real-time the "whole-home" energy consumption and cost during the period that the contractors are working. The homeowner can then compare this information to a "whole-home" energy consumption and cost that was tracked during a period when the contractors were not at work in the home. By taking a difference between the amounts at the two different time periods, the homeowner can then determine how much energy was consumed by the contractor tasks. Thus, the energy consumption user interface and monitoring algorithm according to an illustrative embodiment of the invention are able to provide the user with an indication of a total energy use in the entire home over a given period of time.

By way of yet another example, the homeowner may want to know how much he/she spends on energy when cooking dinner. In accordance with an energy consumption user interface and monitoring algorithm according to an illustrative embodiment of the invention, the homeowner can obtain an accurate indication of the energy consumption and cost.

In accordance with an energy consumption user interface and monitoring algorithm according to an illustrative embodiment of the invention, a database is maintained that contains, for example, one-minute resolution (or some other time resolution) energy consumption and cost information for a monitored facility such as a home or a monitored appliance such as a laundry dryer.

As will be explained in an illustrative embodiment below, a person accesses the energy consumption function through a user interface and selects a start feature (e.g., touchscreen-activated button) on the user interface. The monitoring algorithm then tracks cumulative energy and cost information from that time forward. The user interface is updated once each minute (or some other time interval) as new entries are written to the database. The monitoring algorithm continually updates the cumulative totals once each minute until the user presses a stop feature (e.g., touchscreen-activated button) on the user interface. A timer feature may also be set on the user interface when it is known in advance how long the appliance to be monitored will operate (e.g., the user selects or sets a predetermined time period to commence upon starting the monitoring function, and which automatically ends at the end of the time period).

The energy consumption (e.g., in kilowatt-hours) and cost (e.g., in dollars and cents) is presented to the person through a display feature on the user interface. Both energy units and cost units can be displayed together, or a person may select which unit to display via a unit selection feature (e.g., button) on the user interface.

It is to be appreciated that the user interface may have other user input features for selecting other functionalities and other user output features for presenting information.

Advantageously, in accordance with illustrative embodiments of the invention, a person is now able to track cumulative energy use and cost information (in real-time with a given time resolution) referenced to a specific start time.

FIG. 1 is a diagram of a home energy system, in accordance with an embodiment of the invention. As shown, home energy system 100 comprises one or more devices 102 upon which an energy consumption user interface according to an embodiment of the invention may be implemented. It is to be appreciated that some of the devices 102 are coupled to a network manager 104, a router 106, or a smart meter 108 (a "smart meter" is generally known to be a device, e.g., an electric meter, able to, inter alia, measure and communicate the amount of energy supplied to a given environment).

For example, an energy consumption user interface may be implemented on an energy display 102-1 coupled to the smart meter 108. Further as shown, an energy consumption user interface may be implemented on a smart appliance 102-2, a thermostat 102-3, an energy display 102-4, or some other device 102-5 coupled to the network manager 104. Similarly, an energy consumption user interface may be implemented on a device 102-6, as an application on a mobile phone 102-7, or as an application on a computer device 102-N coupled to the router 106.

It is to be appreciated that embodiments of the invention are not limited to the manner in which the devices 102 are coupled to the network manager 104, the router 106, or the smart meter 108. By way of example only, device 102-1 may be coupled to the smart meter 108 by a Zigbee wireless protocol connection (denoted in FIG. 1 as a solid line). Devices 102-2 through 102-5 may be coupled to the network manager 104 in the same manner. Devices 102-6 through 102-N are coupled to the router 106 via an Ethernet or Wifi wireless protocol connection (denoted in FIG. 1 as a solid line with dots). The router 106 and the network manager 104 may be coupled to one another via the same type of connection.

Also shown in FIG. 1 is a utility 110 which is coupled to the smart meter 108 via some other form of connection (denoted in FIG. 1 as a solid line with x's). Such a connection may be wireless, wired, or some combination thereof.

Note also that the network manager 104 and the smart meter 108 each are configured with a controller 112, which includes a processor 114 and memory 116. It is to be understood that the energy consumption monitoring algorithm, mentioned above, may be stored in the memory 116, and when ready to be executed, loaded into processor 114 and executed. This is also where the database, mentioned above, may be stored and accessed. The energy consumption database and monitoring algorithm are illustratively depicted as 118 in FIG. 1. It is to be appreciated that, alternatively, the monitoring algorithm and/or the energy consumption database could be stored and executed by a controller (processor/memory) resident in one or more of the devices 102. Also, a standalone dedicated controller (not expressly shown) could be employed to store and execute the database and/or algorithm.

The phrase "smart appliance" is intended to generally refer to an appliance, e.g., a household refrigerator, dishwasher, laundry washer, laundry dryer, etc., that is able to, inter alia, provide operational data, e.g., energy consumption, to a network controller (e.g., network manager 104). For example, a smart appliance is disclosed in application Ser. No. 12/899,986, filed Oct. 7, 2010, the disclosure of which is incorporated herein by reference in its entirety.

Figure 2:
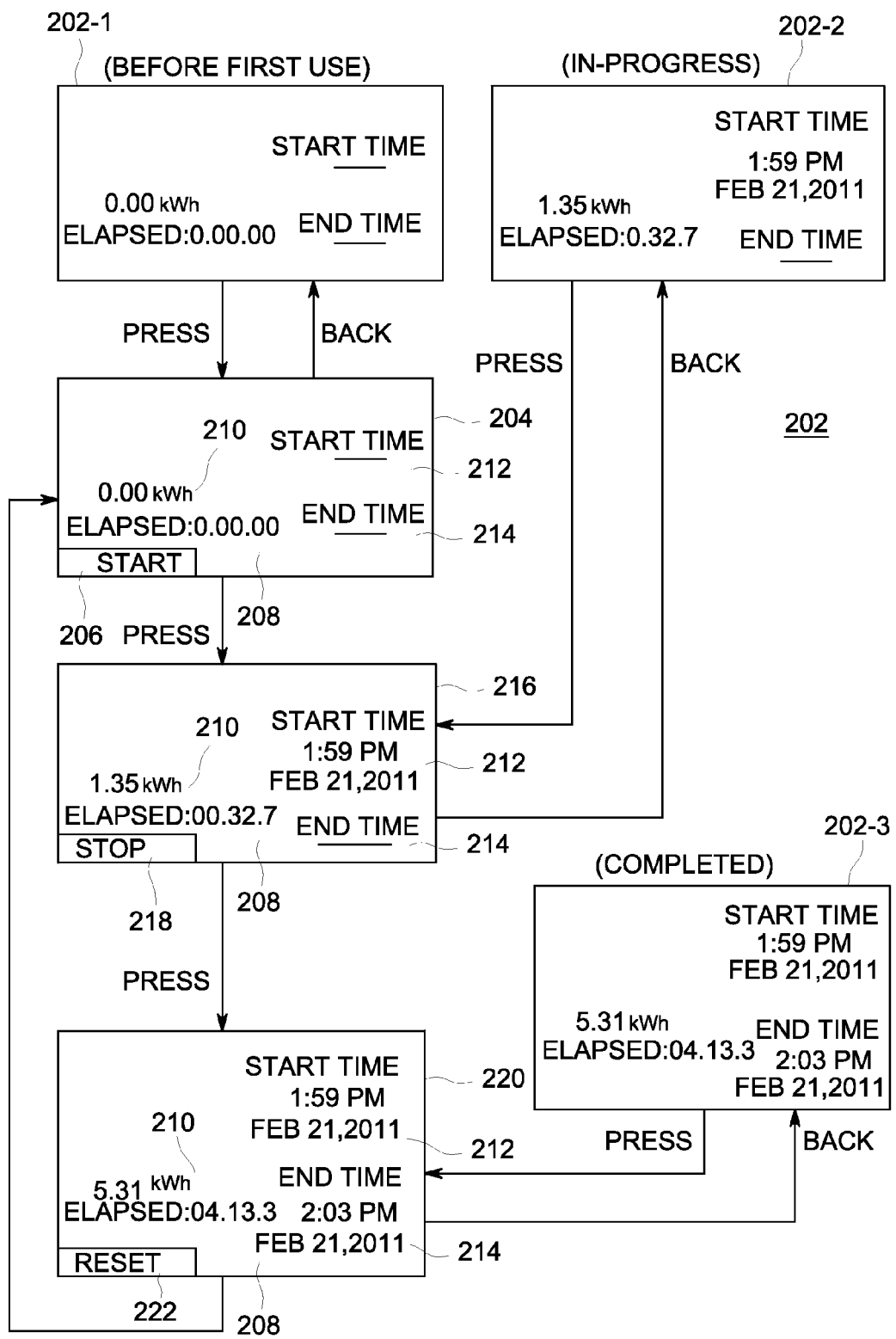
FIG. 2 is a diagram of exemplary views of an energy consumption user interface, in accordance with an embodiment of the invention.

FIG. 2 is a diagram of exemplary views of an energy consumption user interface, in accordance with an embodiment of the invention. As shown in the figure, a sequence of views of an energy consumption user interface 202 is illustrated from a point before a selected start time (202-1), a point in progress (202-2), and at a selected end time (202-3).

It is assumed that the user interface is implemented to monitor at least one energy consumption task from a plurality of energy consumption tasks that contribute to a total energy consumption in a given environment, wherein the plurality of energy consumption tasks are associated with one or more appliances that operate in the given environment. By way of example only, the user interface 202 could be associated with a laundry dryer in a home/residence for which the user wishes to learn how much energy is used to dry a given load of laundry. The user would activate the monitoring function of the user interface upon starting the laundry drying cycle, and end the monitoring function at the end of the laundry drying cycle. Alternately, the start and end times could be automatically effectuated by the monitoring system receiving one or more signals from the appliance as to when an operational cycle begins and ends. The user interface may also be designed to permit the user to select an appliance to monitor (rather than the user interface being dedicated to any specific appliance).

In this illustrative embodiment, energy consumption user interface view 202 is considered a home screen. The energy consumption user interface home screen can be selected and displayed on one of the displays associated with one of the device 102 in FIG. 1. It is also to be understood that, in an illustrative embodiment, the display upon which the user interface is presented is touchscreen-capable, i.e., a user is able to touch an icon or area on the screen (user input feature) to make/activate a selection. Any suitable type of touchscreen technology can be employed. Other methods of inputting user selection may be employed, e.g., mouse/cursor selection and keyboard entry. Furthermore, as shown in an energy consumption user interface, information is displayed to the user in other icons or areas on the screen (user output features). Note that the user may go between home screen views 202 and intermediate screen views 204, 216 and 220 shown in FIG. 2 by pressing the screen of the user interface at a given area. For example, the user may view the intermediate screens by pressing "enter" and "back" keys on the display.

As specifically depicted in view 204 (assumed to be displayed to the user upon the user touching the home screen view 202-1), the user interface comprises a start button 206, an elapsed time display window 208, an accrued energy consumption display window 210, a start time display window 212, and an end time display window 214.

The user then presses the start button 206 to begin the energy consumption monitoring function. As shown in view 216 (corresponding to home screen view 202-2), the start time is displayed in window 212, and the current accrued energy consumption is displayed in window 210. Window 208 shows the elapsed time since the start button was pressed. Also note that, in view 216, a stop button 218 is displayed.

The user then presses the stop button 218 to end the energy consumption monitoring function. It is assumed that the energy consumption task that the user wished to monitor occurred between the start and stop times. As shown in view 220 (corresponding to home screen view 202-3), the start time is displayed in window 212, the end time is displayed in window 214, and the total accrued energy consumption is displayed in window 210. Window 208 shows the elapsed time between selection of the start button and the stop button. Also note that, in view 220, a reset button 218 is displayed. The reset button allows the user to purge the previous accrued information, and start the monitoring process again.

Note that the user can leave the monitoring function operating in the background while navigating other display functions on the device that is hosting the energy consumption user interface. After use, the monitoring results continue to display on the home screen until the reset button is selected.

Thus, in this given example, it is noted that the appliance task that the energy consumption user interface was monitoring consumed 5.31 kWh over a time period of 4 minutes and 13.3 seconds. As will be seen in the context of FIG. 4, the user can select a cost unit feature to display the cost associated with this amount of energy consumption.

Figure 3:
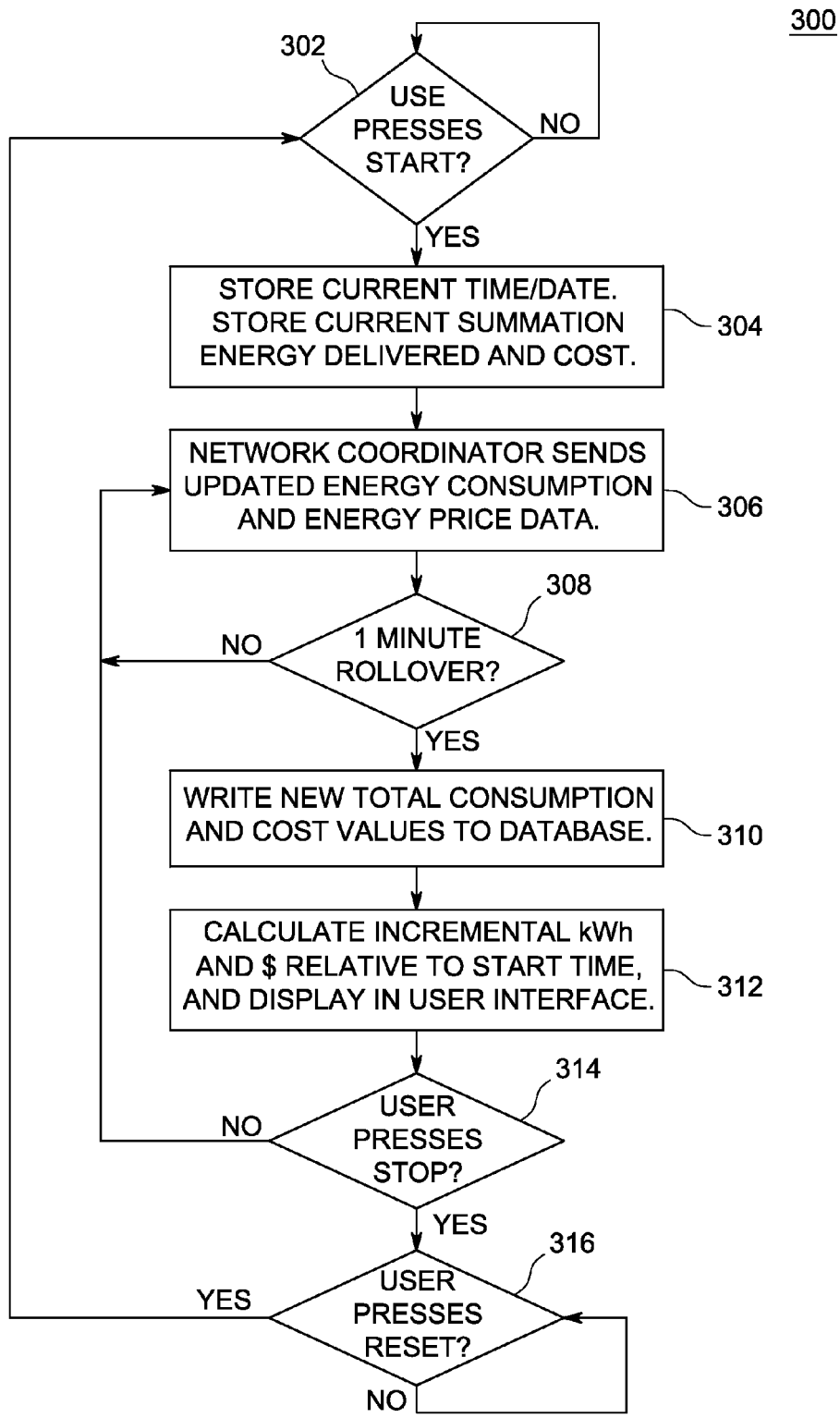
FIG. 3 is a diagram of an energy consumption monitoring algorithm, in accordance with an embodiment of the invention.

FIG. 3 is a diagram of an energy consumption monitoring algorithm, in accordance with an embodiment of the invention. Recall that, in accordance with an energy consumption user interface and monitoring algorithm according to an illustrative embodiment of the invention, a database is maintained that contains, for example, one-minute resolution (or some other time resolution) energy consumption and cost information for a monitored facility or a monitored appliance. The algorithm 300 in FIG. 3 depicts how the information that gets displayed in the user interface (FIG. 2) is generated and from what information it is processed.

Thus, in step 302, it is assumed that the user presses the start button (206 on user interface of FIG. 2). In step 304, the algorithm 300 latches the current time/date and also the current values of total energy delivered and total dollars spent. This information is obtained from the database (e.g., stored in memory 116 of FIG. 1). This information is later used as a reference point for calculating incremental energy consumption and cost, i.e.: (i) original time; (ii) original cost; and (iii) original kWh.

In step 306, a network coordinator (e.g., network manager 104 and/or smart meter 108 in FIG. 1) periodically acquires the current price of energy, and also any incremental energy that has been consumed (for all or a portion of tasks in the given environment to be monitored). This is preferably always happening in the background independent of whether or not the monitoring function at the user interface is activated. This information is maintained in the database.

Assuming a 1-minute rollover (time resolution) in step 308, an entry is added to the database (step 310) every minute with the total accrued energy consumption and total accrued energy cost to that point.

In step 310, the algorithm 300 calculates incremental energy and cost information relative to the start time. This information is displayed in the user interface as explained above in the context of FIG. 2. The incremental information can be derived/computed as follows:

Incremental time=current time−original time.

Incremental kWh=current kWh−original kWh.

Incremental cost=current $−original $.

Incremental time is displayed in the elapsed time window 208 (FIG. 2), and the incremental energy consumption is displayed in window 210. The incremental cost can be displayed in window 210 when the user interface includes a selection feature for choosing between energy units and cost units (as will be described below in the context of FIG. 4).

Step 314 in the algorithm corresponds to the user pressing the stop button (218 on user interface of FIG. 2), while step 316 corresponds to the user pressing the reset button (222 on user interface of FIG. 2).

Figure 4:
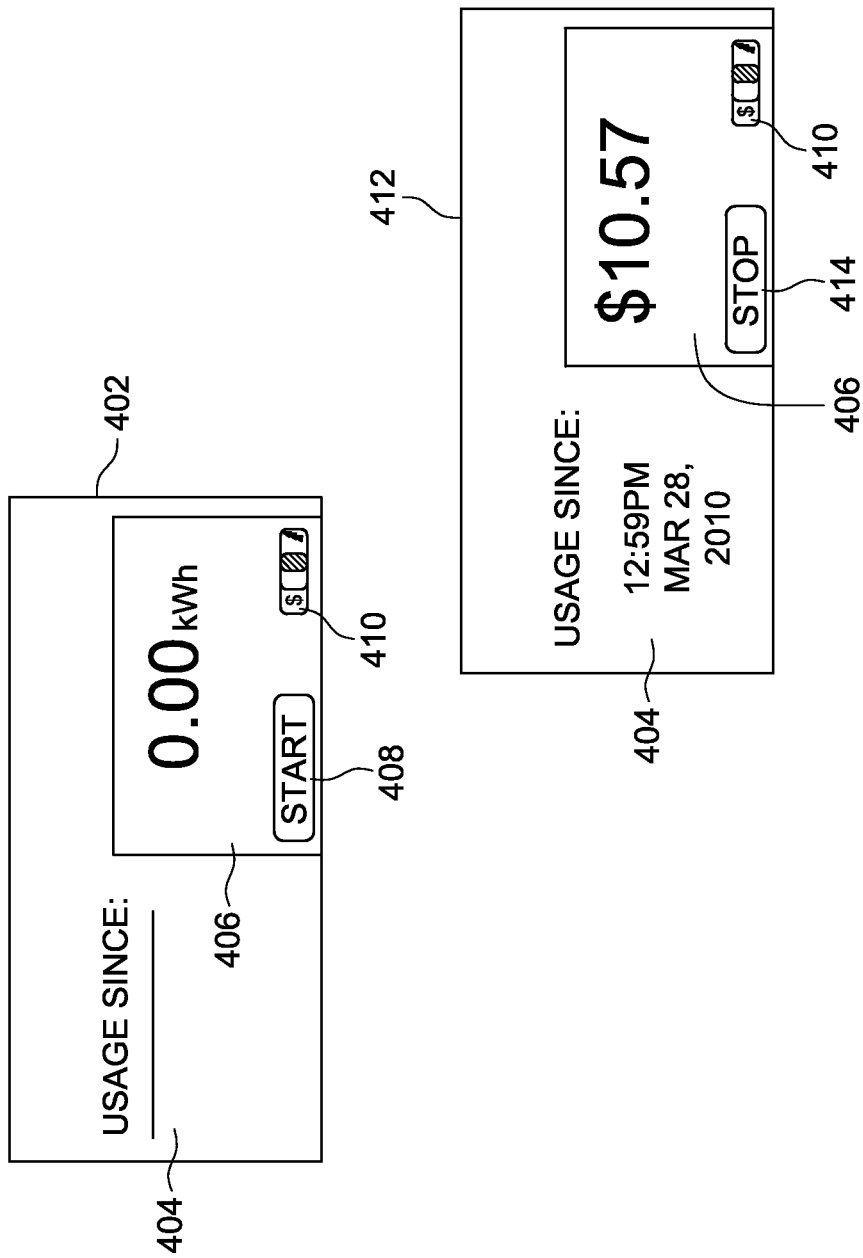
FIG. 4 is a diagram of further exemplary views of an energy consumption user interface, in accordance with an embodiment of the invention.

FIG. 4 is a diagram of further exemplary views of an energy consumption user interface, in accordance with an embodiment of the invention. More particularly, FIG. 4 shows the energy consumption unit selection feature for selecting whether information on the user interface is presented in energy units (kWh) or cost units (dollars and cents).

In view 402, the user interface comprises a usage start true window 404, an accrued energy consumption window 406, a start button 408 and a unit selection slider button 410. The start time window and start button function as explained above.

However, note that when the slider 410 is moved to an energy unit position (lightning bolt symbol), the accrued energy consumption window 406 displays accrued energy consumption in kWh (view 402 shows 0.00 kWh since the monitoring function has not yet started). But when the slider button 410 is moved to a cost unit position (dollar symbol), the window 406 displays accrued energy consumption in terms of cost (view 412 shows cost accrued as of the start time noted in the usage start time window 404). View 412 also comprises a stop button 414 which functions as explained above.

Note that the user interfaces of FIGS. 2 and 4 could be combined so that one user interface with all the user input and output features described are presented on one display screen. Alternately, less features and/or other features not expressly shown can be implemented on the user interface.

Thus, while there have been shown and described and pointed out fundamental novel features of the invention as applied to exemplary embodiments thereof, it will be understood that various omissions and substitutions and changes in the form and details of the devices illustrated, and in their operation, may be made by those skilled in the art without departing from the spirit of the invention. Moreover, it is expressly intended that all combinations of those elements and/or method steps which perform substantially the same function in substantially the same way to achieve the same results are within the scope of the invention. Furthermore, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A resource consumption user interface comprising:
   one or more user input features permitting a user to select a start time and an end time for monitoring at least one resource consumption task from a plurality of resource consumption tasks that contribute to a total resource consumption in a given environment, wherein the plurality of resource consumption tasks are associated with one or more appliances that operate in the given environment; and
   one or more user output features for presenting information about the selected resource consumption task, beginning at the selected start time, and updating the presented information until the selected end time is reached,
   wherein updating the presented information comprises presenting information about the selected resource consumption task from a current accrued time relative to the selected start time and
   wherein the user interface is implemented using at least one processor.

2. The resource consumption user interface of claim 1, wherein the information presented and updated comprises a resource consumption value represented in one of a resource unit and a cost unit.

3. The resource consumption user interface of claim 2, further comprising a resource consumption unit selection feature for selecting whether the information is presented in the resource unit or the cost unit.

4. The resource consumption user interface of claim 1, wherein the one or more user input features and the one or more user output features are implemented in accordance with one or more of a display, an appliance, a thermostat, and a computing device.

5. The resource consumption user interface of claim 1, wherein the information presented and updated is derived from at least one database that maintains resource consumption information associated with the one or more appliances that operate in the given environment.

6. The resource consumption user interface of claim 1, wherein the given environment comprises a home environment.

7. The resource consumption user interface of claim 1, wherein the resource comprises an energy resource.

8. The resource consumption user interface of claim 7, wherein the energy resource comprises one of electricity and natural gas.

9. The resource consumption user interface of claim 1, wherein the resource comprises water.

10. A resource consumption system comprising:
    a user interface comprising: (i) one or more user input features permitting a user to select a start time and an end time for monitoring at least one resource consumption task from a plurality of resource consumption tasks that contribute to a total resource consumption in a given environment, wherein the plurality of resource consumption tasks are associated with one or more appliances that operate in the given environment; and (ii) one or more user output features for presenting information about the selected resource consumption task, beginning at the selected start time, and updating the presented information until the selected end time is reached; and a controller coupled to the user interface and configured to:
(i) receive one or more selections from the one or more user input features; and (ii) in response thereto, provide the information to the one or more user output features for presentation, wherein updating the presented information comprises presenting information about the selected resource consumption task from a current accrued time relative to the selected start time and wherein the resource consumption system is implemented using at least one processor.

11. The resource consumption system of claim 10, wherein the controller is further configured to obtain, from at least one database, resource consumption information associated with the one or more appliances that operate in the given environment.

12. The resource consumption system of claim 11, wherein the controller is further configured to calculate incremental resource consumption in terms of at least one of a resource unit and a cost unit.

13. The resource consumption system of claim 12, wherein the controller computes an incremental time value as a difference between the current accrued time and the selected start time.

14. The resource consumption system of claim 12, wherein the controller computes an incremental resource usage value as a difference between a current accrued resource usage and a resource usage at the selected start time.

15. The resource consumption system of claim 12, wherein the controller computes an incremental cost value as a difference between a current accrued cost and a cost at the selected start time.

16. The resource consumption system of claim 10, wherein the user interface is implemented in accordance with one or more of a display, an appliance, a thermostat, and a computing device.

17. The resource consumption system of claim 10, wherein the given environment comprises a home environment.

18. The resource consumption system of claim 12, wherein the resource comprises an energy resource.

19. The resource consumption system of claim 18, wherein the energy resource comprises one of electricity and natural gas.

20. The resource consumption system of claim 12, wherein the resource comprises water.

* * * * *